United States Patent [19]
Thoman

[11] Patent Number: 6,138,580
[45] Date of Patent: *Oct. 31, 2000

[54] TEMPERATURE CONTROLLED COMPOSITE BOXCAR

[75] Inventor: Mell R. Thoman, Carrollton, Tex.

[73] Assignee: TRN Business Trust, Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/020,372

[22] Filed: Feb. 9, 1998

Related U.S. Application Data

[63] Continuation-in-part of application No. 08/684,564, Jul. 19, 1996, Pat. No. 5,857,414.

[51] Int. Cl.⁷ .................................................. B61D 17/00
[52] U.S. Cl. .......................... 105/396; 105/404; 105/355
[58] Field of Search .................................. 105/396, 397, 105/401, 404, 409, 355

[56] References Cited

U.S. PATENT DOCUMENTS

| | | |
|---|---|---|
| 709,894 | 9/1902 | Ferrell . |
| 1,133,335 | 3/1915 | Summers . |
| 1,170,129 | 2/1916 | Weaver . |
| 1,749,473 | 3/1930 | Des Islets . |
| 2,620,226 | 12/1952 | Jones ............................................. 298/27 |
| 2,635,559 | 4/1953 | Nystrom et al. ......................... 105/416 |
| 2,783,718 | 3/1957 | Cheshire .................................... 105/419 |
| 2,788,750 | 4/1957 | Priest ........................................ 105/406 |
| 3,057,284 | 10/1962 | Learmont .................................. 410/135 |
| 3,100,458 | 8/1963 | Baker et al. ............................... 105/397 |
| 3,175,520 | 3/1965 | Talmey ...................................... 105/409 |
| 3,200,549 | 8/1965 | Cripe ........................................... 52/376 |
| 3,252,430 | 5/1966 | Eckhardt et al. ........................ 105/397 |
| 3,266,441 | 8/1966 | Pulcrano ................................... 105/416 |
| 3,563,403 | 2/1971 | Luisada et al. ........................... 220/1.5 |
| 3,599,575 | 8/1971 | Yurkoski et al. ........................ 105/358 |
| 3,616,764 | 11/1971 | Johnson et al. .......................... 105/366 |
| 4,076,166 | 2/1978 | Austill ....................................... 228/157 |

(List continued on next page.)

FOREIGN PATENT DOCUMENTS

| | | | |
|---|---|---|---|
| 232242 | 6/1959 | Australia .............................. 105/397 |
| 145249 | 12/1980 | Germany .............................. 105/401 |
| 3911138 | 10/1990 | Germany . | |

OTHER PUBLICATIONS

Co–pending application No. 08/684,345 entitled *Insulated Composite Railway Boxcar and Method* filed Jul. 19, 1996 (Attorney's Docket 091078.0444).

(List continued on next page.)

*Primary Examiner*—S. Joseph Morano
*Assistant Examiner*—Robert J. McCarry, Jr.
*Attorney, Agent, or Firm*—Baker Botts L.L.P.

[57] ABSTRACT

A composite box structure having a core encapsulated in multiple layers of fiber reinforced plastic is provided. The core may be formed from various materials which provide improved resistance to heat transfer between the interior and the exterior of the composite box structure. The composite box structure includes a pair of end walls, a pair of side walls, a floor and a roof with fiber reinforced plastic interior and exterior surfaces. An opening is formed in each side wall to allow access to the interior of the composite box structure. An opening may also be formed in one end of the composite box structure to allow installing a temperature control system therein. An airflow management system may be incorporated into selected interior portions of the roof, side walls, end walls and floor. The composite box structure may be mounted on a railway car underframe to provide a temperature controlled composite boxcar.

23 Claims, 7 Drawing Sheets

U.S. PATENT DOCUMENTS

| | | | |
|---|---|---|---|
| 4,209,892 | 7/1980 | Hofstaedter et al. | 105/401 |
| 4,226,189 | 10/1980 | Bertolini | 105/423 |
| 4,230,048 | 10/1980 | Gordon et al. | 105/248 |
| 4,275,662 | 6/1981 | Adler et al. | 105/377 |
| 4,286,507 | 9/1981 | Dorpmund | 98/32 |
| 4,292,898 | 10/1981 | Gordon et al. | 105/238 |
| 4,422,558 | 12/1983 | Mittelmann et al. | 220/1.5 |
| 4,469,541 | 9/1984 | Goldsworthy | 156/180 |
| 4,474,632 | 10/1984 | Spees | 156/78 |
| 4,497,258 | 2/1985 | Ruhmann et al. | 105/248 |
| 4,498,941 | 2/1985 | Goldsworthy | 156/148 |
| 4,608,931 | 9/1986 | Ruhmann et al. | 105/248 |
| 4,902,215 | 2/1990 | Seemann, III | 425/406 |
| 4,904,017 | 2/1990 | Ehrlich | 296/181 |
| 4,998,637 | 3/1991 | Marovskis | 220/1.5 |
| 5,042,395 | 8/1991 | Wackerle et al. | 105/397 |
| 5,050,402 | 9/1991 | Graaff | 62/457.9 |
| 5,052,906 | 10/1991 | Seemann | 425/112 |
| 5,114,516 | 5/1992 | Pilling et al. | 156/180 |
| 5,168,717 | 12/1992 | Mowatt-Larssen | 62/239 |
| 5,201,432 | 4/1993 | Elvin-Jensen | 220/1.5 |
| 5,246,321 | 9/1993 | Hesch | 410/58 |
| 5,255,806 | 10/1993 | Korzeniowski et al. | 220/1.5 |
| 5,265,748 | 11/1993 | Furukawa | 220/1.5 |
| 5,299,405 | 4/1994 | Thompson | 52/795 |
| 5,316,462 | 5/1994 | Seemann | 425/112 |
| 5,320,046 | 6/1994 | Hesch | 105/413 |
| 5,362,345 | 11/1994 | Stettler et al. | 105/397 |
| 5,370,482 | 12/1994 | Long | 105/406 |
| 5,373,792 | 12/1994 | Pileggi et al. | 105/406 |
| 5,383,406 | 1/1995 | Vanolo et al. | 105/401 |
| 5,386,674 | 2/1995 | Sfirakis et al. | 52/243.1 |
| 5,392,717 | 2/1995 | Hesch et al. | 105/404 |
| 5,403,062 | 4/1995 | Sjostedt et al. | 296/181 |
| 5,403,063 | 4/1995 | Sjostedt et al. | 296/187 |
| 5,449,081 | 9/1995 | Sjostedt et al. | 220/1.5 |
| 5,450,977 | 9/1995 | Moe | 220/1.5 |
| 5,458,066 | 10/1995 | Ishida et al. | 105/397 |
| 5,601,034 | 2/1997 | Tao et al. | 105/423 |
| 5,690,378 | 11/1997 | Romesburg | 296/181 |

OTHER PUBLICATIONS

Co–pending application No. 08/684,564 entitled *Composite Box Structure for a Railway Boxcar* filed Jul. 19, 1996 (Attorney's Docket 091078.0446).

Co–pending application No. 08/684,537 entitled *Load Divider Assembly and Door Assembly for a Composite Railway Boxcar* filed Jul. 19, 1996 (Attorney's Docket 091078.0447).

Co–pending application No. 08/859,671 entitled *Insulated Composite Railway Boxcar and Method* filed May 20, 1997 (Attorney's Docket 091078.0587).

Co–pending application No. 08/859,575 entitled *Insulated Composite Railway Boxcar Underframe* filed May 20, 1997 (Attorney's Docket 091078.0588).

Co–pending application No. 08/684,345 entitled *Railway Car Underframe for an Insulated Composite Boxcar* filed Dec. 5, 1997 (Attorney's Docket 091078.0650).

Single Page: "Freight Cars: Mechanical Refrigerator." Pacific Fruit Express, p. 135.

Manual: "Equipment Diagram for Unrestricted Interchange Service." Association of American Railroads Mechanical Division, Aug. 1991, pp. C–249–C–256.2.

Article: "A better boat, a greener boatwords." Sail Magazine, Aug. 1993, pp. 27–29.

Brochure: "Simply . . . Making it Easier to Ship Your Frozen Foods." General American Transportation Corporation.

Brochure: "Scrimp Systems . . . Composite performance and quality." Dupont, Delaware Technology Park.

Catalog pages from General American Transportation Corporation on GATX Articar (8 pages).

Catalog pages from Stoughton Composites, Inc. on Domestic Container (5 pages).

Catalog pages from Pullman–Standard, Division of Pullman Incorporated, on Foamed–in–Place Insulated Box Cars (5 pages).

Catalog pages from Pacific Car and Foundry Company (19 pages).

Catalog page on C.H. Robinson 48–foot domestic container.

Catalog pages from GRAAFF GmbH on "Sandwich Technology or Refrigerated and Insulated Transport Equipment" May 1994 (9 pages).

Miscellaneous pages from *Introduction to Composites on Constituents of Composites* (20 pages).

G. Welty "New Designs, New Materials, Freight Cars", Railway Age, Feb. 1994, pp. 29.

M. Gabriele, "Pultrusion's Promise", Plastics Technology, Mar. 1995, pp. 36.

"FRP Goes After Intermodal Container Market", Plastics World, Oct. 1993, pp. 16.

Brochure, "Stoughton Composites, Inc. Introduces 'Lightweight Refrigerated Domestic Containers'", Stoughton Composites, Dec. 1993, pp. 1–10.

Drawing, "Car Body Assembly" Graaff GmbH, May 1994, pp. 1.

Catalogue Item, "Durashield Foam Core Building Panels", Ryerson Plastics Catalogue No. 21, 1992, pp. 112.

Shippers Problems . . . Trinity's Solution!, Trinity Industries, Inc. advertisement.

"Trinity Steel Box Car Key Features", specification sheet.

Letter from American Composite Inc. of Aug. 27, 1997 including a list of Custom Fiberglass and Composites.

"Thermo King 'Smart Reefer' Model SB–III SR: The Refrigeration Unit with a Brain" brochure, Jul. 1994 (6 pages).

"Thermo King Smart Reefers: More Than Temperature Control" brochure, Jun. 1994 (6 pages).

Complaint, True North Composites, LLC v. Trinity Industries, Inc., Civil Action 99–783 RRM, U.S. District Court for the District of Delaware Nov. 1999.

Answer, True North Composites, LLC v. Trinity Industries, Inc., Civil Action 99–783 RRM, U.S. District Court for the District of Delaware Dec. 1999.

TEMPERATURE CONTROLLED COMPOSITE BOXCAR

RELATED APPLICATIONS

This application is a continuation-in-part application from pending CPA application entitled Composite Box Structure For A Railway Car, U.S. Ser. No. 08/684,564, filed Jul. 19, 1996, U.S. Pat. No. 5,857,414 issued Jan. 12, 1999.

This application is related to CPA application entitled Insulated Composite Railway Boxcar and Method, filed on Jul. 17, 1996, U.S. Ser. No. 08/684,345, now U.S. Pat. No. 5,765,485 issued Jun. 16, 1998; CPA application entitled Load Divider Assembly and Door Assembly for a Composite Railway Boxcar, filed on Jul. 19, 1996, U.S. Ser. No. 08/684,537, now U.S. Pat. No. 5,802,984 issued Sep. 8, 1998; application entitled Insulated Composite Railway Boxcar and Method, filed May 20, 1997, U.S. Ser. No. 08/859,671, now U.S. Pat. No. 5,890,435 issued Apr. 6, 1999; and application entitled Insulated Composite Railway Boxcar and Method, filed May 20,1997, U.S. Ser. No. 08/859,575, now U.S. Pat. No. 5,855,174 issues Jan. 5, 1999.

TECHNICAL FIELD OF THE INVENTION

This invention relates generally to a composite box structure and more particularly to a composite box structure with a temperature control system which may be used in manufacturing a temperature controlled composite boxcar.

BACKGROUND OF THE INVENTION

Over the years, general purpose railway boxcars have progressed from relatively simple wooden structures mounted on flat cars to more elaborate arrangements including insulated walls and refrigeration equipment. Various types of insulated railway boxcars are presently manufactured and used. A typical insulated railway boxcar includes an enclosed structure mounted on a railway car underframe. The enclosed structure generally has an outer shell, one or more layers of insulation and interior paneling. The outer shell of such railway boxcars often has an exterior surface formed from various types of metal such as steel or aluminum. The interior paneling is often formed from wood and/or metal as desired for the specific application. For some applications the interior paneling has been formed from fiber reinforced plastic (FRP). Various types of sliding doors including plug type doors are generally provided on each side of conventional railway boxcars for loading and unloading freight. Conventional railway boxcars are assembled from various pieces of wood, steel and/or sheets of composite materials such as fiberglass reinforced plastic. Significant amounts of raw material, labor and time are often required to complete the manufacture and assembly of conventional railway boxcars.

The underframe for many railway boxcars include a center sill with a pair of end sills and a pair of side sills arranged in a generally rectangular configuration corresponding approximately with the dimensions for the floor of the railway boxcar. Cross bearers and cross ties are provided to establish the desired rigidity and strength for transmission of vertical loads from the side sills to the center sill and for dissipating horizontal end loads on the center sill to other portions of the underframe. A plurality of longitudinal stringers are also provided on each side of the center sill to support the floor of the enclosed structure. Examples of such railway car underframes are shown in U.S. Pat. No. 2,783,718 and 3,266,441.

For many years various techniques have been used to build fiberglass boat hulls. Many of these hulls have been fabricated using wet layup techniques in which each layer of material such as fiberglass or carbon fiber is first wetted with the desired resin such as polyester or vinylester and then laid in an open mold. Recently, vacuum bagging techniques have been combined with wet layup techniques to control the emission of volatile organic compounds. Vacuum bagging also produces a stronger structure by eliminating air pockets and excess resin in the finished product.

More recently, vacuum bagging techniques have been combined with an enhanced resin delivery system which allows the use of a closed molding system and dry layup of core layers and fiber reinforcing layers such as fiberglass in the mold. This process may sometimes be referred to as composite resin infusion molding. U.S. Pat. Nos. 4,902,215; 5,052,906 and 5,316,462 provide additional information concerning this type of vacuum bagging process to form a fiberglass reinforced composite article.

Various types of load dividers and freight securing systems have previously been used to prevent undesired movement of freight contained within a railway boxcar. The use of such systems is particularly important when a railway boxcar is only partially loaded. Examples of such systems are shown in U.S. Pat. No. 5,370,482 entitled "Cargo Securement System" and U.S. Pat. No. 5,386,674 entitled "Two Piece Bulkhead Door for Rail Cars and the Like."

SUMMARY OF THE INVENTION

In accordance with teachings of the present invention, disadvantages and problems associated with previous refrigerated railway boxcars have been substantially reduced or eliminated. The present invention provides a composite box structure with a temperature control system and an airflow management system. Fabricating the composite box structure in accordance with teachings of the present invention provides enhanced insulation, reduced weight, increased load carrying capacity, better temperature regulation and increased service life as compared to a typical refrigerated boxcar. A composite box structure incorporating teachings of the present invention allows assembly of the associated temperature controlled composite boxcar with similar or reduced costs as compared to conventional refrigerated boxcars with substantially the same performance characteristics.

Technical advantages of the present invention include providing a temperature controlled composite boxcar that may satisfactorily maintain a set temperature, between 0° F. to 80° F., of products shipped in the boxcar. The present invention allows varying the length and/or the height of the composite box structure as desired for each application. Also, a temperature controlled composite boxcar incorporating teachings of the present invention may be economically used to ship frozen products, fresh products or dry food or non-food products, which do not require refrigeration or temperature control. A composite box structure incorporating teachings of the present invention allows increasing the length of the resulting temperature controlled composite boxcar without exceeding gross railway load limits. For some applications, a temperature controlled composite boxcar incorporating teachings of the present invention will have a cubic volume which is approximately 87% larger than the cubic volume of a corresponding conventional refrigerated boxcar and a weight carrying capacity 55% greater than that of a corresponding conventional refrigerated boxcar. Due to increased efficiency of the temperature control system, airflow management system and enhanced insulation of the composite box structure, the refrigeration or cooling system requires less fuel, which reduces the weight of the composite boxcar as compared to conventional refrigerated boxcars. As a result of the present invention, the maintenance and operating costs are lower and fuel costs are lower. Technical advantages of the present invention include maintaining a set temperature within the interior of the composite box structure with a consistent uniform airflow when the interior of the boxcar is loaded with products.

Further technical advantages of the present invention include providing a temperature controlled composite boxcar which may be satisfactory used to transport a wide variety of products. For some applications, temperatures within the associated boxcar may be maintained below freezing. For other applications, satisfactory air temperatures may be maintained within the boxcar without using the associated cooling system. Also, the refrigeration or cooling system may include satellite monitoring equipment or cellular technology to communicate information to customers such as location of the temperature controlled composite boxcar and temperature within the car.

Another technical advantage of the present invention may include providing a fuel tank located proximate the refrigeration or cooling system for more convenient access to the fuel tank.

Another aspect of the present invention includes providing an airflow management system. A temperature control unit or refrigeration system may be located at one end of the temperature controlled composite boxcar. A plenum within the interior portion of the roof of the composite box structure may provide an airflow path from the refrigeration or cooling unit to other portions of the boxcar. Outlets from the plenum are designed to maintain positive pressure flow within the plenum to provide uniform distribution of cool air throughout the length and width of the interior portion of the composite box structure. For some applications, the side walls, the end walls and the floor of the temperature controlled composite boxcar may also include airflow channels. The size and configuration of the flow channels, the side walls, the end walls, and the plenum may be varied to establish a relatively uniform distribution of cool air throughout the length, width and height of the interior of the composite box structure. The spacing between the flow channels may be increased or decreased as appropriate. Also, the dimensions of the airflow channels may be increased or decreased as required.

BRIEF DESCRIPTION OF THE DRAWINGS

For a more complete understanding of the present invention, and the advantages thereof, reference is now made to the following written description taken in conjunction with the accompanying drawings, in which.

DETAILED DESCRIPTION OF THE INVENTION

The preferred embodiments of the present invention and its advantages are best understood by referring to FIGS. 1A through 10 of the drawings, like numerals being used for like and corresponding parts of the various drawings.

Figure 1A:
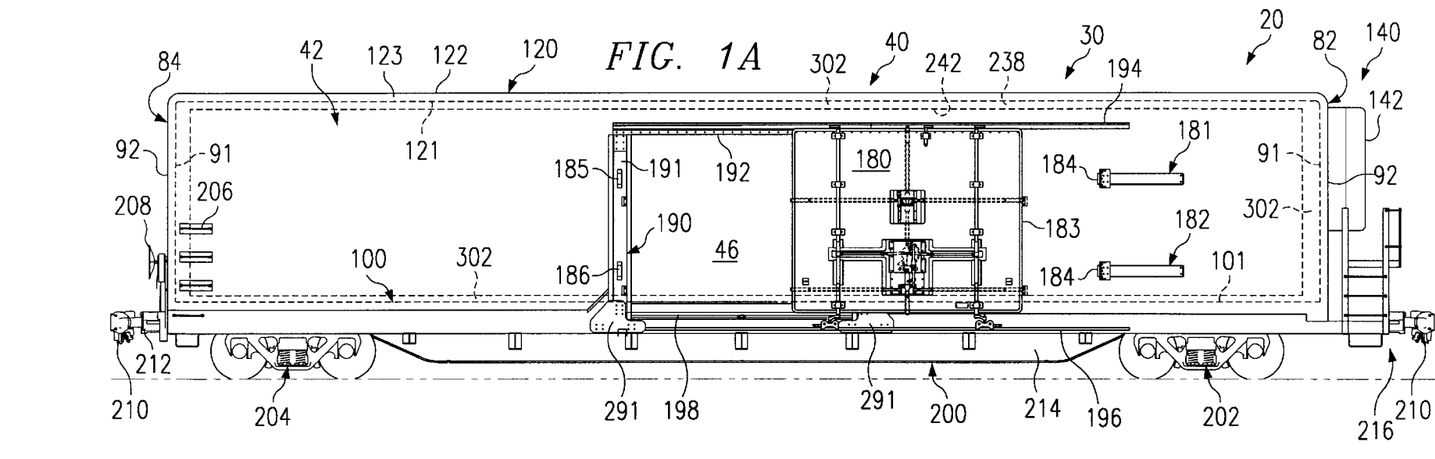
FIG. 1A is a schematic drawing in elevation showing a side view of a temperature controlled composite boxcar having a composite box structure with a temperature control system and an airflow management system incorporating one embodiment of the present invention.
Figure 1B:
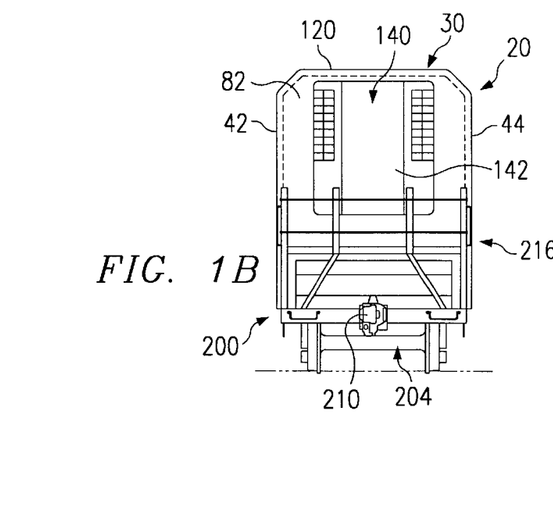
FIG. 1B is an end view of the temperature controlled composite boxcar of FIG. 1A.

Temperature controlled composite boxcar 20 incorporating teachings of the present invention is shown in FIGS. 1A and 1B with composite box structure 30 mounted on railway car underframe 200. As will be discussed later in more detail, composite boxcar 20 includes temperature control system 140. Refrigeration unit 142 is a major component of temperature control system 140. Airflow management system 300 is another major component of temperature control system 140.

Composite box structure 30 may be adhesively bonded and/or mechanically engaged with railway car underframe 200. For some applications, only mechanical connections may be formed between composite box structure 30 and railway car underframe 200. For other applications, only adhesive bonds may be formed. For still other applications, a combination of adhesive bonds and mechanical connections may be formed between composite box structure 30 and railway car underframe 200.

For the embodiment of the present invention shown in FIGS. 1A and 1B temperature controlled composite boxcar 20 has exterior dimensions which satisfy the requirements of Plate C and associated structural design requirements of the Association of American Railroads (AAR). Combining composite box structure 30 formed from light weight composite materials with temperature control system 140 in accordance with teachings of the present invention allows reducing the weight of composite boxcar 20 while at the same time increasing both the internal volume and the load carrying capacity of composite boxcar 20 as compared to a conventional refrigerated boxcar satisfying Plate C requirements.

The present invention allows modifying composite box structure 30 to accommodate various geometric configurations based on specific customer requirements concerning the size, type, and temperature requirements of freight that will be carried in the resulting composite boxcar 20.

For purposes of this patent application, the term "fiber reinforced plastic" is used to refer to composite materials composed of selected thermosetting or thermoplastic resins and fibers, filaments, or whiskers of material such as glass, metal, aramid, boron, carbon, aluminum silicate and other suitable ceramic materials. For some applications, small flakes of metal, ceramics, cermets, or other suitable materials may be dispersed within the selected resin or resins to provide additional reinforcement and strength for the resulting fiber reinforced plastic.

For purposes of this patent application, the term "resin" is used to include both naturally occurring and synthetic polymers which may be mixed with various additives such as fillers, colorants, plasticizers, and curing agents, to infuse or impregnate the selected fiber material to form the desired fiber reinforced plastic layers and surfaces during fabrication of composite box structure 30. For one application the fiber material preferably includes glass fibers typically associated with FIBERGLAS® products available from Owens-Corning.

Temperature control system 140 preferably includes refrigeration unit or cooling unit 142 and airflow management system 300 which provides uniform, constant airflow around and through the lading within composite box structure 30. For other applications, such as transporting products in subzero, winter environments, temperature control system 140 may include a heater.

Refrigeration unit 142 may be a self-contained refrigeration unit including a condenser (not shown expressly), airflow blowers (not shown expressly), and an external fuel tank (not shown expressly), and may be powered by a diesel engine (not shown expressly). For some applications, refrigeration unit 142 may provide air flow in the range of 3600 CFM. Self-contained refrigeration unit 142 provides the advantage of easier and faster maintenance as compared to conventional refrigerated boxcars with similar performance characteristics. As a result, temperature control system 140 will generally lower maintenance time and costs and increase the amount of time that composite boxcar 20 remains in service between repairs.

Refrigeration unit 142 may be a programmable unit able to control and maintain desired temperatures within composite box structure 30. Refrigeration unit 142 may include a keypad for inputting data for desired system performance and a microprocessor to control and monitor the functions and performance of refrigeration unit 142 and temperature control system 140. Refrigeration unit 142 may also include a satellite monitoring system (not shown expressly) or cellular technology to transmit to remote locations such information as the performance or location of refrigeration unit 142 or the temperature inside composite box structure 30. For some applications, refrigeration unit 142 may be a Model SB-III SR® "SMART REEFER" self-contained refrigeration system available from Thermo King, which is commonly used in motor carrier trailers and other large containers. Other providers of refrigeration units which may be satisfactorily used with the present invention include Carrier and Dring.

As shown in FIGS. 1A and 1B refrigeration unit 142 may be mounted on end wall 82 of the composite box structure 30. End platform system 216 may be coupled to railway car underframe 200 near refrigeration unit 142 to provide easy access to refrigeration unit 142. Alternatively, refrigeration unit 142 may be mounted on a secondary end wall or bulkhead (not shown expressly) located within composite box structure 30 to provide better protection for refrigeration unit 142.

Refrigeration unit 142 may include an external fuel tank (not shown expressly) which may be located proximate refrigeration unit 142. This provides the benefit of convenient access to both the fuel tank and refrigeration unit 142. For one application, the fuel tank may be located below end platform 216. The fuel tank may also be coupled to railway car underframe 200 below the area of door 180, or near the wheels or railway trucks 202 or 204. Locating the fuel tank within portions of railway car underframe 200 may provide better protection in the event of a possible collision between boxcar 200 and other railway cars or obstacles.

The second major component of temperature control system 140 is airflow management system 300. The purpose of airflow management system 300 is to establish a relatively uniform distribution of air at a desired temperature throughout the length, width and height of the interior portion of composite box structure 30. Airflow management system 300 allows cooled air to circulate from refrigeration unit 142, around and through the products or lading contained within composite box structure 30, and back to refrigeration unit 142 or out of composite box structure 30. Airflow management system 300 may also be capable of circulating fresh air from outside composite box structure 30 or heated air throughout the interior portion of composite box structure 30.

Depending upon the intended application for composite boxcar 20, refrigeration unit 142 may or may not be used in conjunction with airflow management system 300. Also, because of the superior insulative characteristics of composite box structure 30, the use of refrigeration unit 142 may not be necessary for particular products and operating environments, for satisfactory temperature regulation of some types of products within composite box structure 30. For these applications, satisfactory air temperatures may be maintained within composite box structure 30 either without using temperature control system 140, or by using only airflow management system 300 to circulate fresh air throughout composite box structure 30. This provides the benefit of a more diverse composite boxcar 20 having the capability of transporting a wide variety of freight, including frozen products, fresh products, or day food or non-food products which do not require refrigeration or temperature control.

Airflow management system 300 provides a path for uniform distribution of air around and through products shipped within composite box structure 30. To accomplish this, airflow management system 300 may include a number of features which keep the products shipped within composite box structure 30 spaced from the interior surfaces of the side walls, end walls, and floor which creates space or gaps for airflow around the product. These features include ceiling plenum system 240, floor grating system 132, end bulkheads or barriers 78 and 80, and sidewall corrugations 54. The features of airflow management system 300 may slightly reduce the volumetric carrying capacity of composite box structure 30, but allow airflow around and through the product shipped inside composite box structure 30 in order to achieve desired temperature regulation of the product.

Composite box structure 30 is preferably fabricated using vacuum bagging techniques which include dry lay up of selected core materials and multiple layers of the selected fiber materials in a closed molding system (not shown expressly) along with an enhanced resin delivery system (not shown expressly). Some of the benefits of using a closed molding system include the ability to fabricate a large number of composite box structures 30 from the same mold with dimensions that meet the selected AAR plate requirements and provide a smooth, aerodynamic exterior surface for the resulting composite boxcar 20.

Closed molding systems and enhanced resin delivery systems may be modified to form composite box structure 30 with various configurations and dimensions as required for the specific composite boxcar 20. U.S. Pat. Nos. 4,902,215; 5,052,906 and 5,316,462 show examples of vacuum bagging techniques satisfactory for use with the present invention. Composite resin infusion molding processes incorporating various features of these patents have been licensed to Hardcore DuPont Composites L.L.C. located at 42 Lukens Drive, New Castle, Delaware. Various types of composite structures molded in accordance with the teachings of these patents are available from Hardcore DuPont.

For the embodiment shown in FIGURES 1A-10, composite box structure 30 is formed from first fiber reinforced composite unit 40 and second fiber reinforced composite unit 120. For some applications, side walls 42 and 44, end walls 82 and 84, floor 100, and roof 120 may be individually molded as separate components which are later attached to each other using a combination of adhesive bonds and/or mechanical fasteners (not expressly shown).

First composite unit 40 includes a pair of opposite side walls 42 and 44, a pair of opposite end walls 82 and 84, and floor 100. Side walls 42 and 44 along with end walls 82 and 84 and floor 100 cooperate with each other to partially define hollow interior 32 of composite box structure 30. Hollow interior 32 corresponds with the interior of composite boxcar 20 in which various types of freight may be placed for shipment. Second composite unit or roof 120 has dimensions corresponding with side walls 42 and 44 and end walls 82 and 84 to allow attaching roof 120 with end walls 82 and 84 and side walls 42 and 44 opposite from floor 100.

Side walls 42 and 44, end walls 82 and 84, and floor 100 are preferably integrally molded with each other using vacuum bagging techniques to form first fiber reinforced composite unit 40. Similar molding techniques may be used to form second fiber reinforced composite unit or roof 120. For some applications, side walls 42 and 44, end walls 82 and 84, floor 100, and roof 120 may be formed as separate components using vacuum bagging techniques. Various adhesive and/or mechanical bonds may then be formed between these separate components to fabricate composite box structure 30.

Both first composite unit 40 and second composite unit 120 preferably have a foam core covered or wrapped with multiple plies of fiber material which has been infused with a selected resin to encapsulate the foam core with one or more layers of fiber reinforced plastic. The multiple plies of fiber material and the selected resin also form fiber reinforced plastic interior surfaces and exterior surfaces for composite box structure 30. Materials other than foam may be used to form the core.

Figure 2:
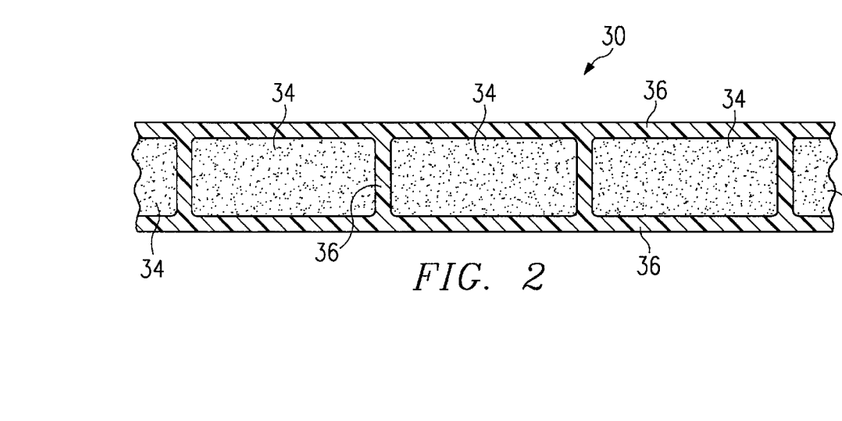
FIG. 2 is a schematic drawing in section with portions broken away showing a portion of a composite box structure incorporating one embodiment of the present invention.

FIG. 2 shows a typical cross section of composite box structure 30 having core 34 encapsulated in multiple layers of fiber reinforced plastic 36. Depending upon the specific application for the resulting composite boxcar 20, this cross section could represent side walls 42 and 44, end walls 82 and 84, floor 100, and/or roof 120.

The portion of composite box structure 30 shown in FIG. 2 has been formed by wrapping a plurality of foam blocks 34 with selected fiber material. Foam blocks 34 are then placed in a closed mold between a first ply of fiber material and a second ply of fiber material. For some applications multiple plies of fiber material may be used to wrap foam blocks 34 and multiple plies of fiber material disposed on what will eventually become the interior surface and the exterior surface of composite box structure 30.

The fiber material wrapped on foam blocks 34 along with the first and second plies of fiber material are then impregnated with selected resin or resins to form a continuous web of fiber reinforced plastic layers 36 encapsulating foam blocks 34. For some applications foam blocks 34 may be coated or treated to prevent foam blocks 34 from absorbing or being infused with the selected resin or resins. Material other than foam blocks may be used to form core 34.

Figure 5:
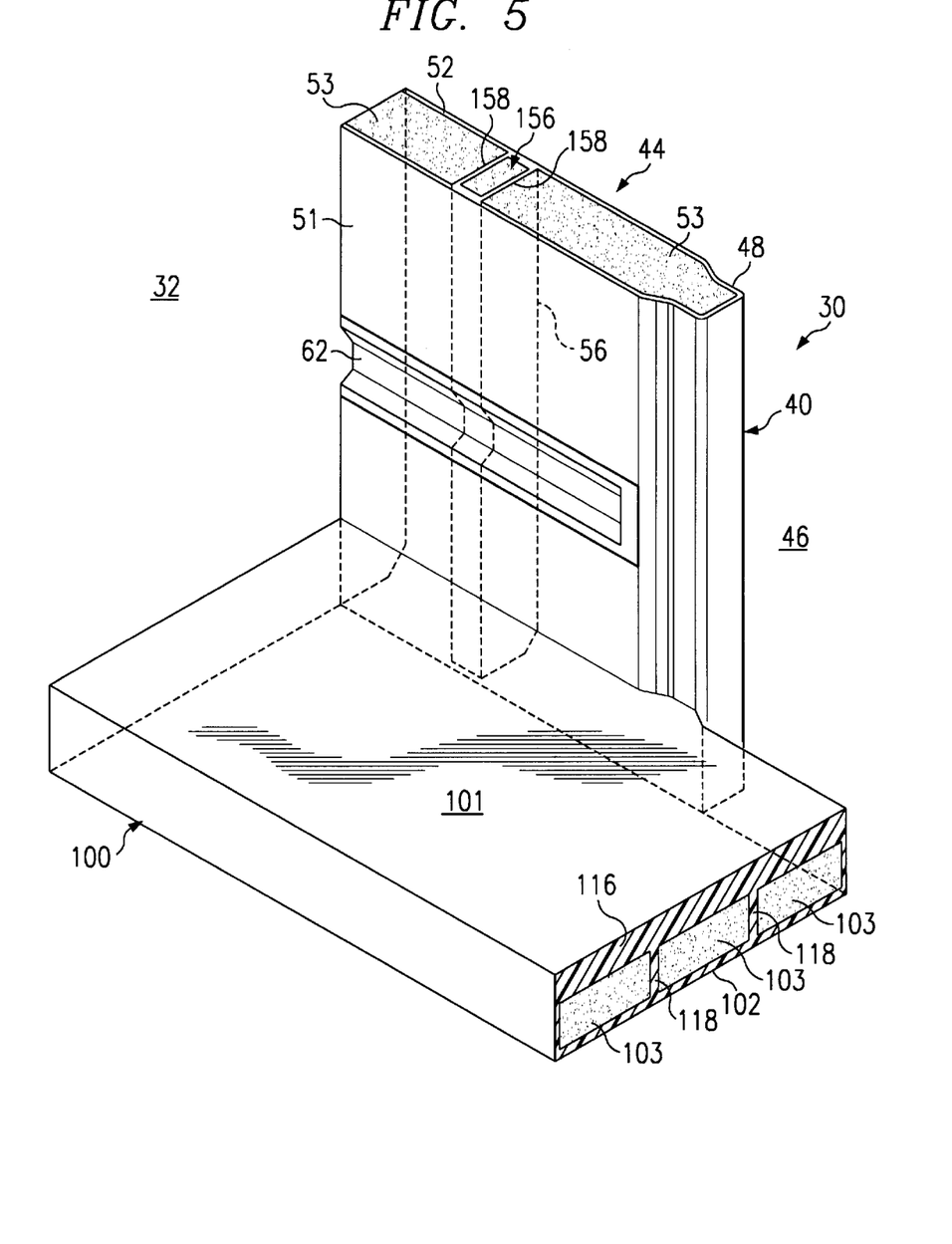
FIG. 5 is a schematic drawing with portions broken away showing an isometric view of a floor and side wall incorporating one embodiment of the present invention.
Figure 6:
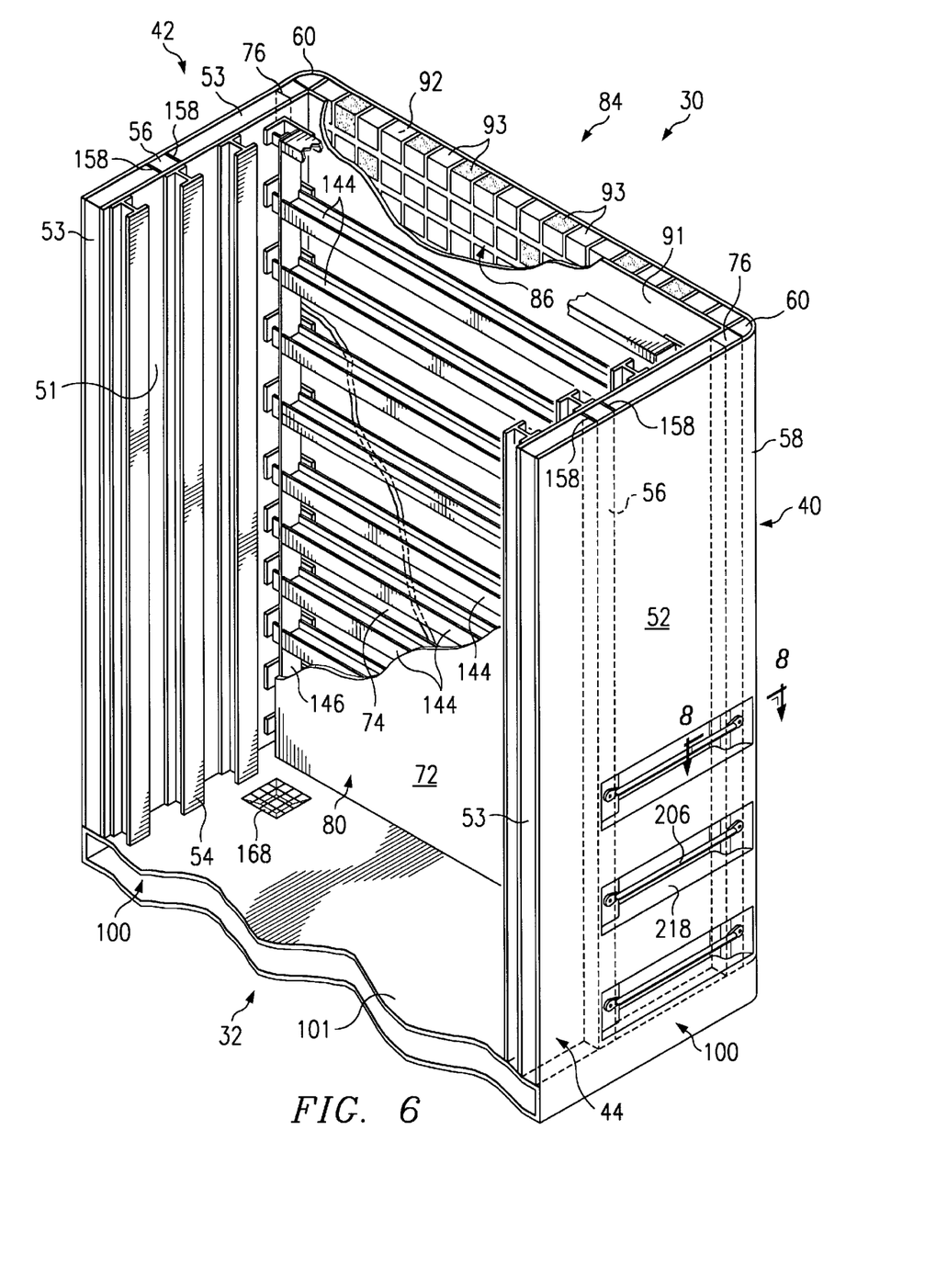
FIG. 6 is a schematic drawing in section and in elevation with portions broken away showing an interior view of a composite box structure having an end wall and a pair of opposite side walls with a barrier spaced from the end wall in accordance with one aspect of the present invention.
Figure 7:
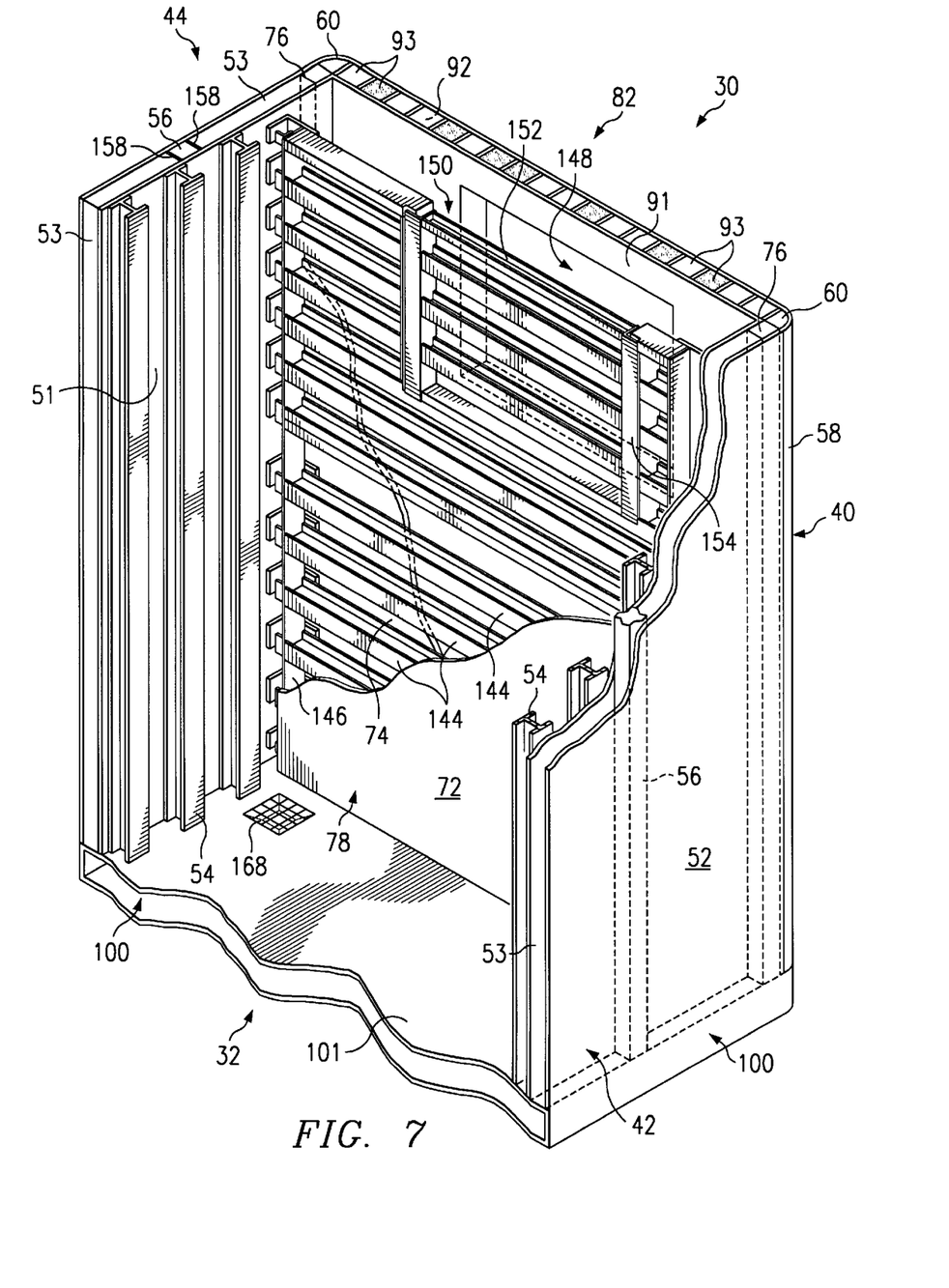
FIG. 7 is a schematic drawing in section and in elevation with portions broken away showing an interior view of a composite box structure having an end wall and a pair of opposite side walls with a barrier spaced from the end wall and a first opening formed in the end wall and a second opening formed in the barrier for installing portions of a temperature control system therein in accordance with one aspect of the present invention.

As shown in FIGS. 5, 6, and 7, end walls 82 and 84 preferably extend between and are integrally molded with respective ends of side walls 42 and 44. Floor 100 extends between and is integrally molded with side walls 42 and 44 and end walls 82 and 84 to form first fiber reinforced composite unit 40. Second fiber reinforced composite unit or roof 120 may be molded as a separate unit and mounted on side walls 42 and 44 and end walls 82 and 84 opposite from floor 100 to form composite box structure 30.

As illustrated in FIGS. 5, 6, 7, and 8, first layer 51 of fiber reinforced plastic is preferably disposed on the interior surface of each side wall 42 and 44. Second layer 52 of fiber reinforced plastic is preferably disposed on the exterior surface of each side wall 42 and 44. Each side wall 42 and 44 preferably includes foam core 53 encapsulated between layers 51 and 52 of fiber reinforced plastic.

Figure 4:
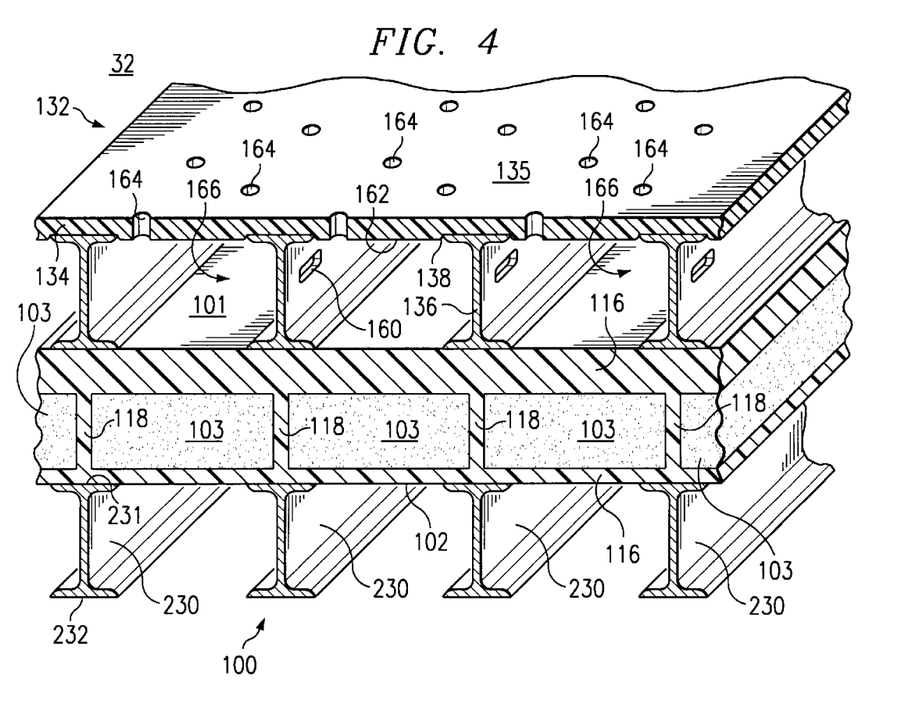
FIG. 4 is a schematic drawing in section with portion broken away showing the first floor of FIG. 3 after the fiber material has been infused with a selected resin and a second floor disposed on the first floor to form a portion of the airflow management system.
Figure 8:
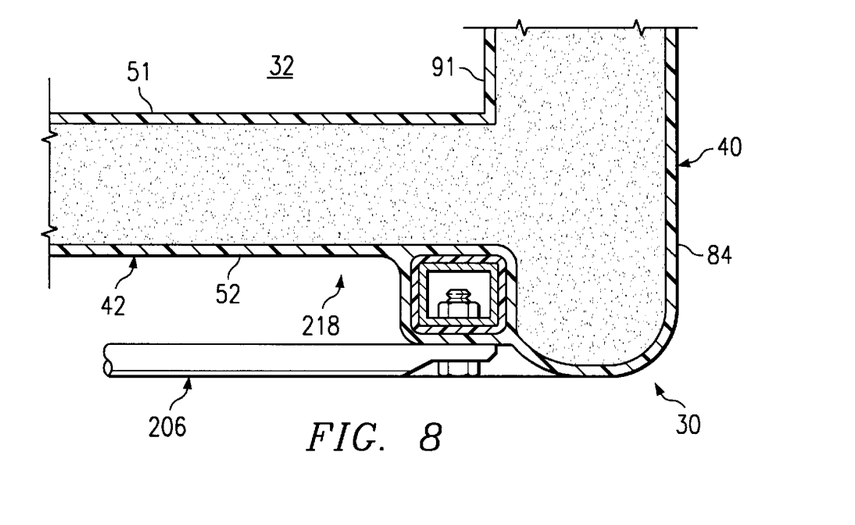
FIG. 8 is an enlarged schematic drawing in section with portions broken away taken along line 8—8 of FIG. 6 showing a ladder integrally molded within a sidewall of the composite box structure.

As shown in FIGS. 6, 7 and 8, first layer 91 of fiber reinforced plastic is preferably disposed on the interior surface of each end wall 82 and 84. Second layer 92 of fiber reinforced plastic is preferably disposed on the exterior surface of each end wall 82 and 84. Each end wall 82 and 84 includes foam core 93 encapsulated between layers 91 and 92 of fiber reinforced plastic. In a similar manner, as shown in FIGS. 4 and 5, floor 100 includes foam cores 103 encapsulated between layers 101 and 102 of fiber reinforced plastic. As indicated in FIGURE 1A, second composite unit or roof 120 may also include foam core 123 encapsulated between layers 121 and 122 of fiber reinforced plastic. The configuration of foam cores 53, 103 and 123 may be varied in accordance with the teachings of the present invention depending upon the requirements of the resulting composite boxcar 20.

As a result of the molding process exterior surfaces 52, 92 and 102 are integrally molded with each other to form a continuous, smooth exterior surface of fiber reinforced plastic for composite boxcar 20.

Foam cores 53, 93, 103 and 123 may be formed from various types of material such as urethane, polyurethane, styrene and polystyrene. For some applications, cores 53, 93, 103 or 123 may be formed with light metal foam. Also, foam cores 53, 93, 103 and 123 may have various configurations such as foam blocks wrapped with one or more plies of a selected fiber material or layers of a selected foam material alternating with plies of a selected fiber material. For still other applications, foam cores 53 and/or 103 may be replaced with light weight wood such as balsa wood or a heavier wood such as plywood.

For some applications, all or a portion of layers 51, 52, 91, 92, 121 and 122 may be formed from two or more plies of fiber material (not expressly shown). One of the technical benefits of the present invention includes providing multiple plies of fiber material to reinforce selected portions of either the interior surface or the exterior surface of composite box structure 30.

The selected foam core and multiple plies of fiber material are placed in a closed molding system having the desired configuration for first composite unit 40 or second composite unit 120. A resin delivery system is used to infuse or impregnate the multiple plies of fiber material with the selected resin. Depending upon the intended application for the resulting composite boxcar 20, the fiber material may include carbon, boron, graphite, glass, aramid or a combination of these materials. Aramids such as KEVLAR® fibers and NOMEX® fibers available from E.I. DuPont De Nemours & Co. may be particularly useful in fabricating railway boxcars. Other fiber materials may be satisfactorily used with the present invention. Again, depending upon the intended application for composite boxcar 20, the resin may be selected from a wide variety of polymers including epoxy, polyester, vinylester and vinyl. Also, other resins may be satisfactorily used with the present invention.

By properly selecting the type of material used to form foam cores 53, 93, 103 and 123 along with other teachings of the present invention which substantially reduce or minimize potential heat transfer paths, composite box structure 30 may have a heat transfer rate of approximately one hundred sixteen (116) BTUs per hour per degree Fahrenheit or less. For some applications, foam core 93 for end walls 82 and 84 may also include a plurality of foam blocks similar to foam blocks 53 or 103 which have been wrapped with fiber material and impregnated with the selected resin during the molding process. Foam core 123 for roof 120 may also be formed from a plurality of foam blocks.

Alternatively, foam cores 53, 93, 103 and/or 123 may be formed from a grid of the selected foam material alternating with plies of the selected fiber material. The configuration of the layers of foam material and fiber material may be varied to provide the desired structural strength for the respective side walls 42 and 44, end walls 82 and 84, floor 100 and roof 120. FIG. 6 shows grid 86 of alternating foam material and plies of fiber material sandwiched between multiple layers of fiber material and infused with the selected resin to form end wall 84. End wall 82 may also be formed from a grid of alternating foam and fiber material. The vertical and horizontal plies of fiber material may be continuous or discontinuous as desired for the selected end wall. U.S. Pat. No. 5,052,906 shows examples of using multiple layers of fiber material and a grid type resin distribution system which may be satisfactory used in the present invention.

Corresponding interior surfaces 91 have at least one layer of fiber reinforced plastic and corresponding exterior surfaces 92 also have at least one layer of fiber reinforced plastic. For one application, two plies of fiber material were used to form interior surface 91 and exterior surface 92. The fiber materials within the grid are infused with resin to form a web of fiber reinforced plastic layers encapsulating the foam material. For one application, end walls 82 and 84 have been formed with this grid configuration having continuous horizontal plies of fiber material and discontinuous vertical plies of fiber material. Side walls 42 and 44, floor 100, and roof 120 may also be formed with a similar grid configuration if desired.

For some applications, the resulting composite box structure 30 may be painted or covered with coating materials that reflect solar energy from the sun. For example, a coating material containing ceramic fibers (not expressly shown) can be applied to the exterior surfaces of composite box structure 30 to significantly reduce the amount of heat absorbed from ultraviolet rays and infrared rays. By using such coating materials, the thickness of foam cores 53, 93, 103 and/or 123 may be reduced while maintaining the same level of insulation or the effectiveness of the insulation may be increased for the same thickness of foam cores. For some applications, the coating material may be applied as part of the resin infusion process. For other applications, the coating material may be applied after fabrication of composite box structure 30 has been completed. Coating systems with various ceramic fibers are available from Energy Research Center in Houston, Tex. Also, 3M Company has available various types of thin film or sheet material that may be applied to the exterior of composite box structure 30 to reflect solar energy.

During the molding process, a generally rectangular opening 46 is formed in each side wall 42 and 44 intermediate the ends of the respective side walls 42 and 44. Following completion of the molding process and typically after composite box structure 30 has been mounted on railway car underframe 200, door 180 is slidably mounted on each side wall 42 and 44 adjacent to the respective opening 46 for use in controlling access to interior portion 32 of composite boxcar 20. The height of each opening 46 preferably extends from floor 100 to the adjacent edge of second composite unit or roof 120. The center of each opening 46 corresponds approximately with the midpoint in the respective side wall 42 and 44. For one application, each opening 46 has a height of approximately nine feet six inches which corresponds to the height of the respective side walls 42 and 44 between adjacent portions of floor 100 and roof 120.

Each door 180 has a first position blocking the respective opening 46 to form a thermal barrier between hollow interior 32 and the exterior of composite boxcar 20. Each door 180 also has a second position which allows access to interior portion 32 of composite boxcar 20 through the respective openings 46. A pair of door stops 181 and 182 are preferably mounted on the exterior of each side wall 42 and 44 to limit the longitudinal movement of the respective door 180 from its first position to its second position. In FIG. 1A, door 180 is shown slidably mounted on upper track 194 and lower track 196 intermediate its first position which blocks opening 46 and its second position in which edge 183 of door 180 contacts its respective door stops 181 and 182. For some application, doors 180 may be formed from the same composite materials as composite box structure 30.

As shown in FIGS. 1A and 1B railway car underframe 200 includes a pair of railway trucks 202 and 204 located adjacent to each end of composite boxcar 20. Safety equipment such as hand brake 208 may be attached to railway car underframe 200 with no connections or attachments to composite box structure 30. End platform 216 may also be attached to railway car underframe 200 to provide access to refrigeration unit 142.

Standard railway couplings 210 are also provided at each end of railway car underframe 200. Each coupling 210 preferably includes end of car cushioning unit 212 disposed between each end of center sill 214 and the respective coupling 210. One of the technical benefits of the present invention includes the ability to add end of car cushioning units 212 having different lengths of travel, depending upon the intended application for the resulting composite boxcar 20. For some applications, cushioning units 212 may have a length of travel of approximately fifteen (15) inches. For other applications, cushioning units 212 may have a length of travel of approximately eighteen (18) inches or more.

Figure 3:
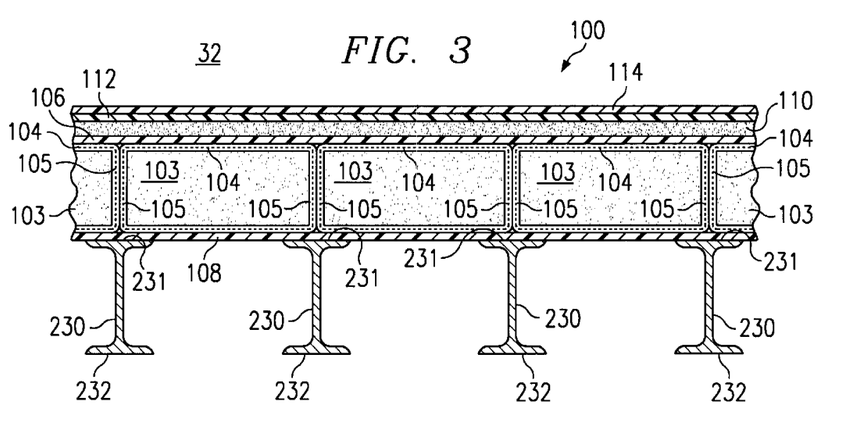
FIG. 3 is a schematic drawing in section with portions broken away showing a first floor with a foam core and multiple plies of fiber material formed in accordance with one aspect of the present invention.

For some applications, railway car underframe 200 preferably includes a plurality of longitudinal stringers 230. Each longitudinal stringer 230 has a first surface 231 and a second surface 232. Portions of exterior surface 102 of floor 100 of composite box structure 30 may be adhesively bonded with first surfaces 231 of longitudinal stringers 230. FIGS. 3 and 4 are schematic representations showing portions of floor 100 disposed on longitudinal stringers 230.

For purposes of illustrating various aspects of the present invention, a portion of floor 100 is shown in FIG. 3 as it would appear without having first been infused with a selected resin. Normally, composite box structure 30 is only mounted on railway car underframe 200 after completion of the molding process which includes infusion with the selected resin or resins.

As illustrated in FIG. 3, floor 100 preferably includes a plurality of foam blocks 103 which have each been wrapped with one or more plies of fiber material 104. During the molding process, foam blocks 103 are disposed adjacent to each other and extend over the length and width of floor 100. This configuration results in vertical plies 105 of fiber material disposed between adjacent foam blocks 103 extending longitudinally along the length of floor 100. First ply 106 of fiber material is disposed on the interior portions of foam blocks 103. A second ply 108 of fiber material is disposed on the exterior of foam blocks 103.

For some applications, floor 100 could then be formed by infusing or molding first ply 106, fiber layers 104 and second ply 108 with the selected resin. The use of vacuum bagging techniques and dry layup of the selected core materials and multiple layers of the selected fiber material allow varying the cross section associated with floor 100 depending upon the specific application in which the resulting composite boxcar 20 will be used.

For many applications, foam blocks 103 will not satisfactorily carry compression and shear forces associated with placing a heavy load such as a forklift (not expressly shown) moving cargo on surface 101 of floor 100. Thus, layer 110 of a felt type material such as polyester may be placed on first fiber ply 106 along with two additional plies 112 and 114 of fiber material. The configuration of felt type material 110 and multiple plies of fiber material 104, 106, 112 and 114 results in providing a thick layer 116 of fiber-reinforced plastic extending over the length and width of surface 101 of floor 100.

The width of foam blocks 103 is preferably selected to be approximately equal to the distance between the centerline of adjacent longitudinal stringers 230. Thus, vertical layers 105 of fiber material are located within floor 100 at a position corresponding approximately with the position of respective longitudinal stringer 230 in railway car underframe 200. As illustrated in FIGS. 3 and 4, infusion of fiber material plies 104, 106 108, 112 and 114 along with felt layer 110 results in forming a continuous web of fiber reinforced plastic which encapsulates foam blocks 103. Thus, any loads placed on surface 101 of floor 100 are transmitted through thick layer 116 of fiber reinforced plastic to vertical layers 118 of fiber reinforced plastic and onto the respective longitudinal stringer 230 to provide the desired load carrying capacity for floor 100.

Plies of fiber material 104, 106, 108, 112 and 114 may be formed from the same types of material. Alternatively, plies 104, 106, 108, 112 and 114 may be formed from different types of fiber material to provide the desired strength for floor 100. When the fiber plies are infused with the selected resin, the resulting structure is a thick, continuous web of fiber reinforced plastic 116 and 118 as shown in FIG. 4. For one application, floor 100 has a thickness of approximately six inches.

As shown in FIG. 4, airflow management system 300 may include floor grating system 132 disposed on surface 101 of floor 100. The purpose of floor grating system 132 is to keep product or lading within composite box structure 30 some distance from surface 101 of floor 100 which gaps for airflow between the product and floor 100. Floor grating system 132 may include a generally flat top surface held above floor 100 by any means as to establish a selected space between the product and surface 101 of floor 100.

For some applications, floor grating system 132 includes a plurality of floor grates 134 held above surface 101 of floor 100. For one application, a plurality of stiffeners 136 running parallel to longitudinal stringers 230 are used to position floor grates 134 a selected distance above floor 100, creating gaps 166 between bottom surface 162 of floor grates 134 and surface 101 of floor 100. This application allows airflow through gaps 166 in the direction parallel to stiffeners 136. Stiffeners 136 may be I-beams, channel members, or any other suitable members.

Stiffeners 136 are preferably vertically aligned with vertical layers of fiber reinforced plastic 118 and/or longitudinal stringers 230. Thus, any loads placed on floor grating system 132 are transmitted through floor grate 134, through stiffeners 136, through thick layer 116 of fiber reinforced plastic, through vertical layers 118 of fiber reinforced plastic and onto the respective longitudinal stringer 230 to provide the desired load carrying capacity for floor grating system 132 and floor 100.

Stiffeners 136 may be fixed to floor grate 134 by any means which will provide stability to floor grating system 132. In one application, stiffeners 136 may be I-beams which are comolded with floor grates 134. Alternatively, floor grates 134 may include corrugations 138 to receive stiffeners 136 such that stiffeners 136 will be appropriately positioned relative to structural members of floor 100 for effective load transfer. Stiffeners 136 may also include corrugations, holes, or openings 160 to allow airflow through stiffeners 136. The number, size, shape, and locations of corrugations, holes, or openings 160 may be varied to optimize the performance of airflow management system 300 for the desired application.

For some embodiments of airflow management system 300 having both side wall corrugations 54, which will be discussed later in more detail, and floor grating system 132, openings 160 of floor grating system 132 are aligned between sidewall corrugations 54 to allow airflow downward between corrugations 54 of side walls 42 and 44, through openings 160, and into gaps 166 of floor grating system 132.

Floor grate 134 may include a plurality of holes 164 through the thickness of floor grate 134. Holes 164 allow airflow from gaps 166 to hollow interior 32 of composite box structure 30 and vice-versa. The number, size, shape, and locations of holes 164 may be varied to optimize the performance of airflow management system 300 for the desired application.

Floor grating system 132 may be divided into a plurality of sections. For some applications, floor grating system 132 is divided into two rows having four to six sections, for a total of eight to twelve sections. Sections of floor grating system 132 may rest on floor 100 such that the sections of floor grating system 132 may be picked up or moved in order to clean floor grating system 132 and the underlying floor 100. As shown in FIG. 7, floor 100 may include a plurality of drains 168 to be used in the cleaning of composite box structure 30.

FIG. 5 shows a portion of side wall 44 and floor 100 adjacent to the respective opening 46. This portion of wall 42 has been formed by wrapping a plurality of foam blocks 53 with the selected fiber material. During the molding process, foam blocks 53 are placed in a closed mold between a first ply of fiber material and a second ply of fiber material. For some applications, multiple plies of fiber materials may be used to wrap foam blocks 53 and multiple layers of fiber material may be disposed on what will eventually become the interior surface 51 and the exterior surface 52 of wall 42. The fiber material plies are then impregnated with the selected resin to form a continuous web of fiber-reinforced plastic layers between adjacent foam blocks and fiber-reinforced plastic layers 51 and 52. As shown in FIGS. 2, 4 and 5, the closed molding system and infusion of resin results in a continuous web of fiber-reinforced plastic. For some applications, foam blocks 53 may be coated or treated to prevent foam blocks 53 from absorbing or being infused with the selected resin. Side wall 42 has a similar cross section.

For some applications, end walls 82 and 84 along with roof 120 and floor 100 may also be formed from a plurality of foam blocks encapsulated in layers of fiber reinforced plastic. One of the technical advantages of the present invention includes the ability to select various types of foam and fiber materials and to vary the configuration of these materials to enhance the performance of the resulting composite box structure 30.

For example, the thickness of foam core 53 is substantially reduced in section 48 of side wall 44 immediately adjacent to opening 46. Three or four plies of fiber material may be used to form section 48 of side wall 44 to provide more strength and resistance to wear at opening 46. The reduced thickness of section 48 allows installation of door 180 and the associated vertical portion of door frame 190. A portion of one of the vertical support beams 56 which are preferably formed in each side wall 44 and 42 is shown in FIG. 5.

For some applications, the strength of side walls 42 and 44 may be substantially increased by forming a plurality of vertical supporting beams 56 during the molding process. As shown in FIGS. 5, 6, and 7, a first group of relatively large foam blocks 53 may be wrapped with fiber material. A second group of smaller foam blocks 156 may be wrapped with fiber material and disposed vertically between adjacent foam blocks 53. The alternating configuration of first foam blocks 53 and second foam blocks 156 provides substantial strength for side walls 42 and 44. Infusing the fiber material on the exterior of the first group of foam blocks 53 and the fiber material on the exterior of the second group of foam blocks 156 forms a continuous web of fiber reinforced plastic layers with vertical layers 158 of fiber reinforced plastic extending between interior surface 51 and exterior surface 52.

For some applications, interior surface or first layer 51 of fiber reinforced plastic is preferably formed from at least two plies of the selected fiber material adjacent to each vertical support beam 56. Exterior surface or second layer 52 of fiber reinforced plastic is preferably formed from at least three plies of the selected fiber material adjacent to each vertical support beam 56.

As shown in FIGS. 1A, 6, and 8, composite boxcar 20 may also include ladder 206 located within recessed area 218 in side walls 42 and/or 44. For some applications, ladder 206 does not protrude beyond the plane formed by the external surface of the respective side wall 42 and/or 44 such that the inclusion of ladder 206 does not increase the total width of composite boxcar 20. Thus, composite boxcar 20 may have an increased width measured from the side wall to side wall as compared to conventional boxcars having ladders which are not located in recessed areas. Thus, fabricating composite box structure 30 with recessed ladder 206 provides the benefit of a larger composite box structure 30 as compared to conventional boxcars.

Ladder 206 may be a single continuous structure or may include a plurality of sections or rungs, steps, or handholds as shown in FIG. 6. Recessed area 218 may include a plurality of recesses for ladder 206. For one application, recess 218 includes a separate recess for each rung or handhold of ladder 206. For other applications, ladder 206 may be located within one larger recessed area 218.

Ladder 206 may be integrally molded within recessed area 218 of the appropriate side or end wall of composite box structure 30. For some applications, ladder 206 may be molded within recessed area 218 during fabrication of the corresponding side or end wall of composite box structure 30. For other applications, as shown in FIG. 8, ladder 206 may be adhesively bonded or mechanically attached to the corresponding side wall or end wall after fabrication of the wall. Ladder 206 may be bolted, welded, or fastened by any other suitable means to the corresponding side wall.

As shown in FIGS. 6 and 7, end bulkheads 78 and 80 may be attached to and extend between side walls 42 and 44 to form a structural barrier for the product shipped within composite box structure 30. End bulkheads or barriers 78 and 80 may be spaced a short distance from respective end walls 82 and 84 to allow space for airflow between the product and the respective end walls 82 and 84. In one embodiment, end bulkheads 78 and 80 may consist of a series of stiffeners 144 running horizontally between and coupled with side walls 42 and 44. Horizontal stiffeners 144 may be connected directly to side walls 42 and 44, or may be connected to vertical channels 146 which may be fixed to side walls 42 and 44. Stiffeners 144 and channels 146 may be I-beams, channel members, or any other suitable members. Horizontal stiffeners 144, vertical channels 146, or any other component of end bulkheads 78 and 80 may be bolted, integrally molded, or connected by any other means to side walls 42 and 44 such that end bulkheads 78 and 80 provide sufficient structural integrity for composite box structure 30.

Thin panels 72 and 74 may be applied to the front and back sides of end bulkheads 78 and 80. Front panels 72 provide flat surfaces for the product within composite box structure 30 to rest against, and prohibit the product from moving through end bulkheads 78 and 80 since freight within composite box structure 30 may tend to shift during movement of composite boxcar 20. Back panels 74 provide smooth surfaces for the backsides of end bulkheads 78 and 80 to allow uniform airflow between end bulkhead 78 and end wall 82 and between end bulkhead 80 and end wall 84.

In particular, back panels 74 may reduce or eliminate airflow turbulence which may be caused if end bulkheads 78 and 80 did not include back panels 74.

As shown in FIG. 7, end wall 82 may be fabricated with first opening 148 for accepting a portion of refrigeration unit 142 therein. End bulkhead 78 may include second opening 150 for refrigeration unit 142 such that a portion of refrigeration unit 142 projecting through opening 148 in end wall 82 may be secured to end bulkhead 78. Second opening 150 may include additional stiffeners 152, channels 154, and/or other components to secure refrigeration unit 142 to end bulkhead 78. Front and back panels 72 and 74 of end bulkhead 78 may have openings or cutouts (not shown expressly) to allow for the installation of refrigeration unit 142 onto composite box structure 30 and for the satisfactory operation of airflow management system 300. For some applications, portions of back panel 72 and 74 and stiffeners 152 may be removed to provide access for servicing and maintenance of refrigeration unit 142.

As shown in FIG. 7, side walls 42 and 44 may include side wall corrugations 54 to allow airflow between the product and side walls 42 and 44. Side wall corrugations 54 protrude from interior surface 51 of side walls 42 and 44 to keep the product within composite box structure 30 some distance from interior surface 51 of side walls 42 and 44, creating gaps for airflow between the product and interior surface 51. For some applications, as shown in FIG. 7, side wall corrugations 54 run vertically along the height of side walls 42 and 44 to create vertical gaps between the product and interior surface 51, allowing upward or downward airflow between the product and side walls 42 and 44.

As shown in FIG. 7, for some applications, side wall corrugations 54 may be I-beams, channel members, or any other suitable members. For another application, side wall corrugations 54 may be integrally molded within side walls 42 and 44 using vacuum bagging techniques similar to those used to fabricate the wall structure of FIG. 2 as previously described. Side walls 42 and 44 of this application consist of a plurality of foam blocks 34 having the appropriate shapes and arrangement to create corrugated side walls 42 and 44, wrapped with selected fiber material, and molded to encapsulate foam blocks 34 in a continuous web of fiber reinforced plastic 36 to form side walls 42 and 44 having side wall corrugations 54.

Figure 10:
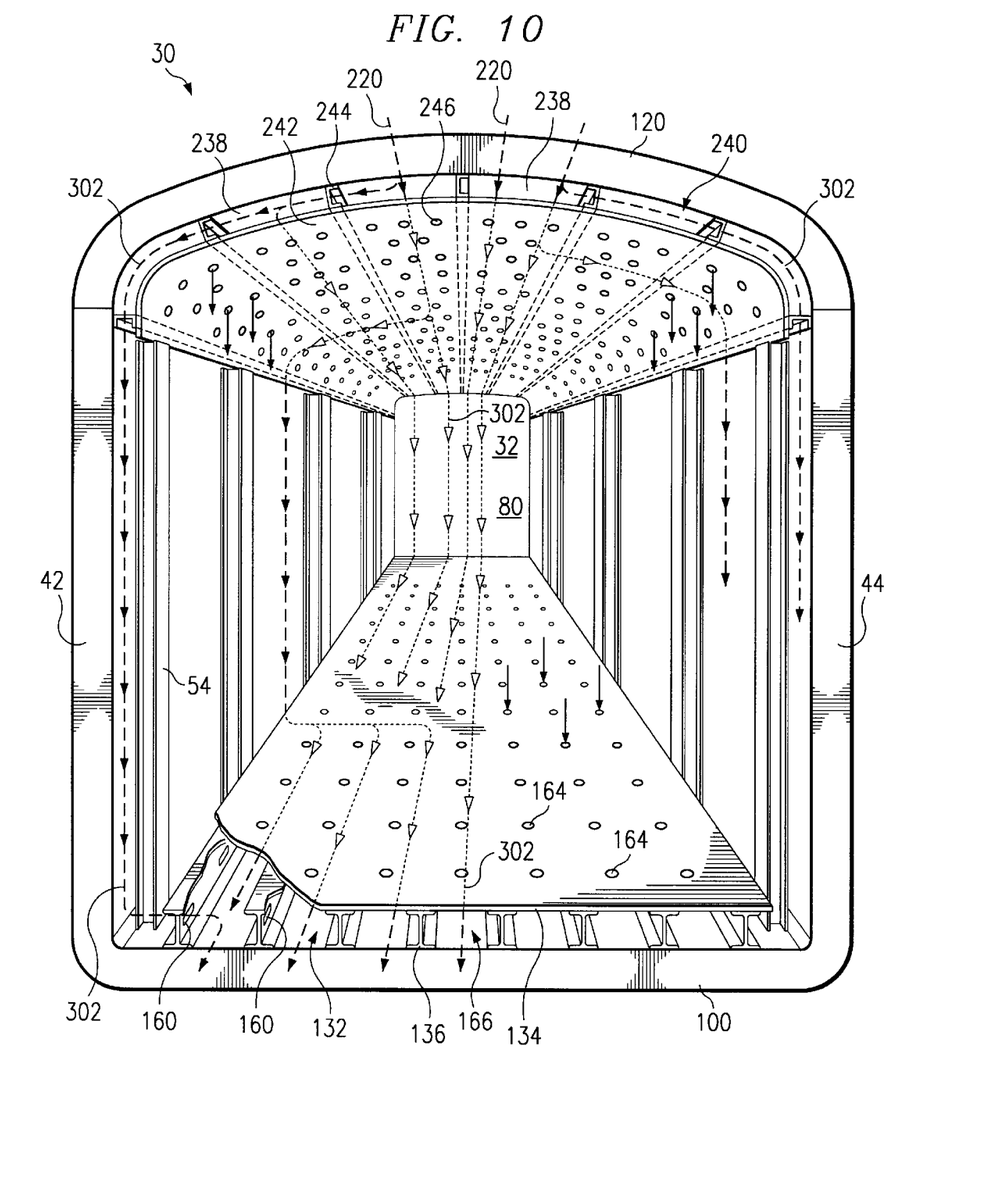
FIG. 10 is a schematic drawing showing a perspective view with portions broken away of an interior portion of a composite box structure having an airflow management system incorporating one embodiment of the present invention.

As shown in FIG. 10, airflow management system 300 may also include ceiling plenum system 240 to distribute air uniformly throughout composite box structure 30. Ceiling plenum system 240 provides a space below inside surface 121 of roof 120 to allow airflow near roof 120.

For some applications, ceiling plenum system 240 may include plenum 242 held at some distance from surface 121 of roof 120 by a plurality of hangers 244 to create gaps 238 for airflow between surface 121 and plenum 242.

Hangers 244 may be I-beams, channel members, or any suitable members to hold plenum 242 away from surface 121 to create gaps 238. Hangers 244 may be connected to roof 120 by any suitable means or may be pre-molded into roof 120 in a manner similar to that described for side wall corrugations 54. As shown in FIGS. 4 and 10, hangers 244 may include openings, holes, or corrugations (not shown expressly) similar to openings 160 in stiffeners 160 of floor grating system 132, to allow airflow through hangers 244. The number, size, shape, and locations of these holes, openings, or corrugations may be varied to optimize the performance of airflow management system 300 for the desired application.

For some applications, plenum 242 may include a flexible material, such as fabric or a thin sheet. Plenum 242 may be connected or fastened to hangers 244 by any suitable means. For some applications, plenum 242 is not permanently fastened to hangers 244. Thus, plenum 242 may be removed for cleaning or replaced with another plenum material having a different number or pattern of holes. This provides the benefit of being able to select the appropriate plenum 242 for the desired airflow for particular applications, resulting in a more versatile temperature controlled composite boxcar 20.

Plenum 242 may include holes 246 that allow airflow through plenum 242. This allows airflow from gaps 238 to hollow interior 32 and vice-versa. The number, size, shape, and locations of holes 246 may be varied to optimize the performance of airflow management system 300 for the desired application.

In operation, refrigeration unit 142 blows cool air into ceiling plenum system 240 near end bulkhead 80, creating a pressurized ceiling area. By creating a pressurized ceiling area, air is forced through the length of the ceiling plenum system 240. Pressurized ceiling plenum system 240 may force airflow back behind end bulkhead 78, and/or towards side walls 42 and 44 and into sidewall corrugations 54, and/or downward through holes 246 of plenum 242. Pressurized ceiling plenum system 240 provides the advantage of uniformly distributing air throughout composite box structure 30.

Figure 9:
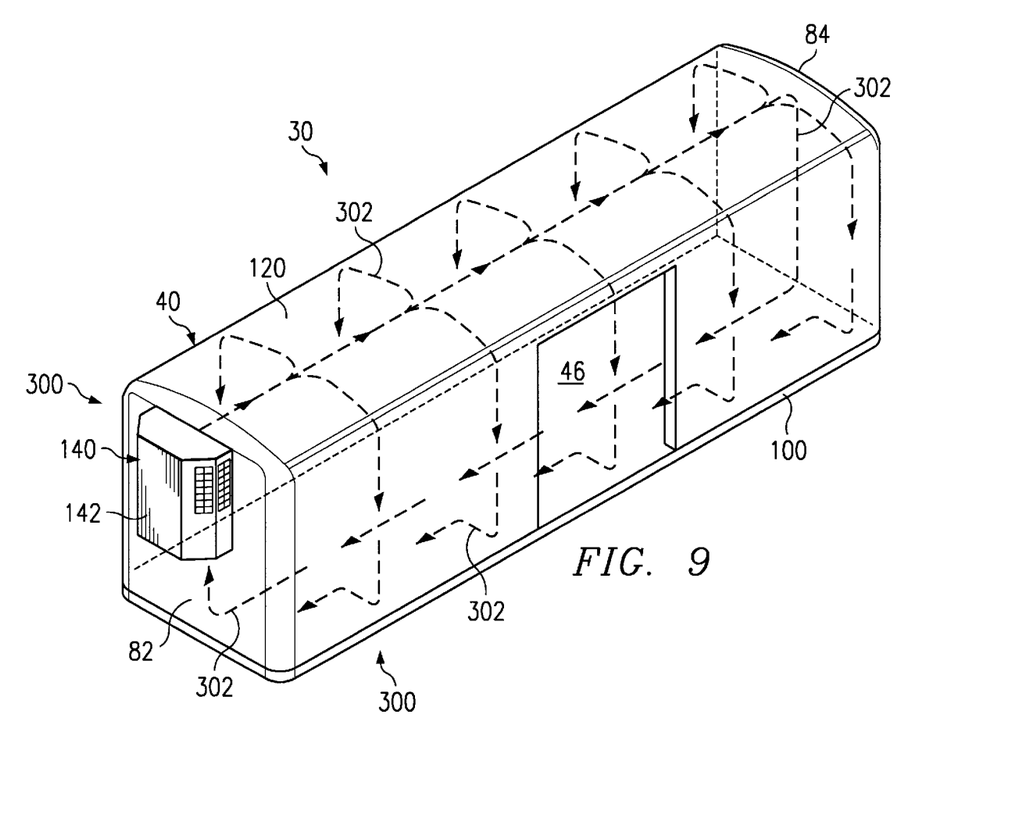
FIG. 9 is a schematic drawing in elevation with portions broken away showing a typical airflow path in a composite box structure incorporating teachings of the present invention.

In operation, airflow management system 300 provides a path and a system for a relatively uniform distribution of cooled air or outside air throughout the length, width and height of the interior of composite box structure 30. As shown in FIG. 9, for some applications, air may flow along airflow path 302. Following airflow path 302, air may initially flow from refrigeration unit 142 just below roof 120 proximate the leading end wall 82 and toward the trailing end wall 84 of composite box structure 30. According to airflow path 302, air may be distributed across the width of and just below roof 120 toward side walls 42 and 44. Following airflow path 302, air may continue to flow down proximate side walls 42 and 44 and end wall 84 toward floor 100. Air may continue flowing along airflow path 302 proximate floor 100 back toward end wall 82 or out of composite box structure 30. For some applications, air may continue to flow back into refrigeration unit 142 to be recycled through airflow path 302.

To accomplish the relatively uniform distribution of air throughout the interior of composite box structure 30, airflow management system 300 may include a number of features including end bulkheads 78 and 80, sidewall corrugations 54, floor grating system 132, and ceiling plenum 240.

One embodiment of airflow management system 300 having end bulkheads 78 and 80, sidewall corrugations 54, floor grating system 132, and ceiling plenum 240 is illustrated in FIG. 10. One possible airflow path 302 created by airflow management system 300 is also shown in FIG. 10. Refrigeration unit 142 may blow cool air 220 into ceiling plenum system 240 near roof 120. Ceiling plenum system 240 fills with air flowing toward side walls 42 and 44 and end bulkhead 80. Openings or holes 246 in plenum 242, if present, and other gaps allowing air to exit ceiling plenum system 240 are preferably sized and arranged to cause ceiling plenum system 240 to become pressurized to ensure a more uniform distribution of air throughout composite box structure 30. Following airflow path 302, air may flow down along sidewalls 42 and 44 between sidewall corrugations 54, and down behind end bulkhead 80, between end bulkhead 80 and end wall 84. Continuing along airflow path 302, air may flow through floor grating system 132, between floor grate 134 and floor 100, back toward end bulkhead 78. Air may return to refrigeration unit 142 to be recycled within composite box structure 30. For some applications, air may flow downward through holes 246 in plenum 244 into hollow interior 32 of composite box structure 30. In addition, for some applications, air may flow downward from hollow interior 32 through holes 164 in floor grate 134.

It should be noted that FIGS. 9 and 10 illustrate only one possible embodiment of the present invention. Airflow management system 300 may include any feature or combination of features which may create any airflow path 302 capable to sufficiently manage the interior temperature of composite box structure 30 for desired application.

Optional features of airflow management system 300, including ceiling plenum system 240, floor grating system 132, end bulkheads 78 and 80, and sidewall corrugations 54 may be connected to one another in any combination. For some applications, features of airflow management system 300 are integrally molded to one another. Features of airflow management system 300 may be adhesively fastened or mechanically attached to other such features by any suitable means such as welding, bolting, or cold molding.

Although the present invention and its advantages have been described in detail, it should be understood that various changes, substitutions and alterations can be made herein without departing from the spirit and scope of the invention as defined by the following claims.

What is claimed is:

1. A composite box structure for mounting on a railway car underframe to form a temperature controlled composite boxcar comprising:
   a pair of opposite substantially rectangular side walls, each side wall having upper and lower edges and ends;
   a pair of opposite substantially rectangular end walls, each end wall having upper and lower edges and ends and extending between and joined to an end of each of the side walls;
   a substantially rectangular floor having opposite side edges and ends, the floor extending between and joined to the lower edges of the side walls and extending between and joined to the lower edges of the end walls;
   a substantially rectangular roof having opposite side edges and ends, the roof extending between and joined to the upper edges of the side walls and extending between and joined to the upper edges of the end walls;
   the side walls, end walls, roof and floor cooperating with each other to define an interior portion of the composite box structure for carrying cargo;
   a respective opening intermediate the ends of each side wall to provide access to the interior portion of the box structure for loading and unloading cargo;
   the side walls, the end walls, the floor and the roof having a plurality of core members wrapped with fiber material and sandwiched between one or more layers of fiber material; and
   a temperature control system for maintaining the interior portion of the composite box structure within a desired temperature range.

2. The composite box structure according to claim 1 wherein the temperature control system further comprises:
   an opening formed in at least one end wall; and
   a refrigeration unit mounted within the opening of the end wall to supply cool air to the interior portion of the composite box structure.

3. The composite box structure according to claim 1 wherein the temperature control system further comprises an airflow management system to regulate and distribute the flow of air within the interior portion of the composite box structure.

4. The composite box structure according to claim 3 wherein the airflow management system further comprises a plenum formed in the roof to uniformly distribute air from one end of the composite box structure to the other end of the composite box structure.

5. The composite box structure according to claim 1 further comprising:
   a first barrier formed within the interior portion of the composite box structure; and
   the first barrier extending between the side walls and spaced from one of the end walls to allow airflow between the barrier and the one end wall.

6. The composite box structure according to claim 5 further comprising:
   a second barrier formed within the interior portion of the composite box structure; and
   the second barrier extending between the side walls and spaced from the other end wall to allow airflow between the second barrier and the other end wall.

7. The composite box structure according to claim 5 wherein the temperature control system further comprises:
   an opening formed in the one end wall;
   a refrigeration unit mounted within the opening of the one end wall to supply cool air to the interior portion of the composite box structure; and
   an opening formed in the first barrier to allow access to the refrigeration unit.

8. The composite box structure according to claim 1 further comprising:
   the plurality of core members sandwiched between an inner surface layer of a fiber material and an outer surface layer of a fiber material; and
   the fiber material wrapped on the core members and the inner and outer surface layers of fiber material impregnated with a resin to form webs of fiber reinforced plastic received between adjacent core members and fiber reinforced plastic layers on the interior and the exterior of the composite box structure.

9. The composite box structure according to claim 1 further comprising:
   a recess formed in an exterior portion of at least one side wall; and
   a ladder disposed within the recess and secured to the side wall.

10. The composite box structure according to claim 1 wherein the temperature control system further comprises:
    an opening formed in at least one end wall;
    a refrigeration unit mounted within the opening of the end wall to supply cool air to the interior portion of the composite box structure; and
    a platform mounted on the exterior of the end wall adjacent to the refrigeration unit to provide access to the refrigeration unit.

11. A temperature controlled composite boxcar having a composite box structure mounted on a railway car underframe comprising:
    the railway car underframe having a coupling at each end for attachment to other railway cars;

a pair of opposite side walls, each side wall having upper and lower edges and ends;

a pair of opposite end walls, each end wall having upper and lower edges and ends and extending between and joined to an end of each of the side walls;

a floor having opposite side edges and ends, the floor extending between and joined to the lower edges of the side walls and extending between and joined to the lower edges of the end walls;

a roof having opposite side edges and ends, the roof extending between and joined to the upper edges of the side walls and extending between and joined to the upper edges of the end walls;

the side walls, end walls, roof and floor cooperating with each other to define an interior portion of the composite box structure for carrying cargo;

a respective opening intermediate the ends of each side wall to provide access to the interior portion of the box structure for loading and unloading cargo;

the side walls, the end walls, the floor and the roof of having a plurality of core members wrapped with fiber material and sandwiched between one or more layers of fiber material;

the fiber material impregnated with a resin to form webs of fiber reinforced plastic disposed between adjacent core members and fiber reinforced plastic layers on the interior and the exterior of the respective side walls, end walls, floor and roof; and a temperature control system for maintaining the interior portion of the composite box structure within a desired temperature range.

12. The temperature controlled boxcar of claim 11 further comprising:

the core members of the side walls, the end walls, the floor and the roof formed from a plurality of foam blocks with each foam block wrapped with the fiber material; and the plurality of foam blocks for the side walls, end walls, floor and roof sandwiched between an inner surface layer of the fiber material and an outer surface layer of the fiber material.

13. The temperature controlled boxcar of claim 11 wherein the temperature control system further comprises:

an opening formed in at least one end wall; and a refrigeration unit mounted within the opening of the end wall to supply cool air to the interior portion of the composite box structure.

14. The temperature controlled boxcar of claim 13 wherein the temperature control system further comprises a fuel supply tank secured within a portion of the railway car underframe.

15. The temperature controlled boxcar of claim 11 further comprising:

a first barrier formed within the interior portion of the composite box structure; and the first barrier extending between the side walls and spaced from one of the end walls to allow airflow between the barrier and the one end wall.

16. The temperature controlled boxcar of claim 15 further comprising:

a second barrier formed within the interior portion of the composite box structure; and the second barrier extending between the side walls and spaced from the other end wall to allow airflow between the second barrier and the other end wall.

17. The temperature controlled boxcar of claim 15 wherein the temperature control system further comprises:

an opening formed in the one end wall;

a refrigeration unit mounted within the opening of the one end wall to supply cool air to the interior portion of the composite box structure; and an opening formed in the first barrier to allow access to the refrigeration unit.

18. The temperature controlled boxcar of claim 11 further comprising:

an opening formed in one of the end walls;

the temperature control system including a refrigeration unit mounted within the opening of the one end wall to supply cool air to the interior portion of the composite box structure; and a platform mounted on the railway car underframe adjacent to the one end wall of the composite box structure to provide access to the refrigeration unit.

19. The temperature controlled boxcar of claim 11 further comprising:

a recess formed in an exterior portion of at least one side wall; and a ladder disposed within the recess.

20. The temperature controlled boxcar of claim 11 further comprising an airflow management system having a plenum formed in the roof to uniformly distribute air from one end of the composite box structure to the other end of the composite box structure.

21. A composite box structure for mounting on a railway car underframe to form a composite boxcar, comprising:

a pair of opposite side walls, each side wall having upper and lower edges and ends;

a pair of opposite end walls, each end wall having upper and lower edges and ends and extending between and joined to an end of each of the side walls;

a floor having opposite side edges and ends, the floor extending between and joined to the lower edges of the side walls and extending between and joined to the lower edges of the end walls;

a roof having opposite side edges and ends, the roof extending between and joined to the upper edges of the side walls and extending between and joined to the upper edges of the end walls;

the side walls, end walls, roof and floor cooperating with each other to define an interior portion of the composite box structure for carrying cargo;

a respective opening intermediate the ends of each side wall to provide access to the interior portion of the box structure for loading and unloading cargo;

the side walls, the end walls, the floor and the roof having a plurality of core members wrapped with fiber material and sandwiched between one or more layers of fiber material;

the fiber material impregnated with a resin to form webs of fiber reinforced plastic received between adjacent core members and fiber reinforced plastic layers on the interior and the exterior of the respective side walls, end walls, floor and roof;

at least one recess formed in an exterior portion of one of the side walls; and at least a portion of a ladder secured within the recess.

22. The composite box structure of claim 21, further comprising a coating material containing ceramic fibers applied to exterior surfaces of the composite box structure.

23. A composite box structure for mounting on a railway car underframe to form a composite boxcar, comprising:

- a pair of opposite side walls, each sidewall having upper and lower edges and ends;
- a pair of opposite end walls, each end wall having upper and lower edges and ends and extending between and joined to an end of each of the side walls;
- a floor having opposite side edges and ends, the floor extending between and joined to the lower edges of the side walls and extending between and joined to the lower edges of the end walls;
- a roof having opposite side edges and ends, the roof extending between and joined to the upper edges of the side walls and extending between and joined to the upper edges of the end walls;
- the side walls, end walls, roof and floor cooperating with each other to define an interior portion of the composite box structure for carrying cargo;
- a respective opening intermediate the ends of each side wall to provide access to the interior portion of the box structure for loading and unloading cargo;
- the side walls, the end walls, the floor and the roof of having a plurality of core members wrapped with fiber material and sandwiched between one or more layers of fiber material;
- the fiber material impregnated with a resin to form webs of fiber reinforced plastic received between adjacent core members and fiber reinforced plastic layers on the interior and the exterior of the respective side walls, end walls, floor and roof; and
- a coating material containing ceramic fibers applied to exterior surfaces of the composite box structure.

* * * * *